(12) United States Patent
Demiryont

(10) Patent No.: US 6,416,194 B1
(45) Date of Patent: Jul. 9, 2002

(54) THERMOSTABLE BACK-SURFACE MIRRORS

(75) Inventor: Hülya Demiryont, Philadelphia, PA (US)

(73) Assignee: Turkiye Sise ve Cam Fabrikalari A.S., Istanbul (TR)

(*) Notice: Subject to any disclaimer, the term of this patent is extended or adjusted under 35 U.S.C. 154(b) by 0 days.

(21) Appl. No.: 09/248,608

(22) Filed: Feb. 11, 1999

(51) Int. Cl.[7] .................. G02B 5/08; G02B 1/10; F21V 9/04

(52) U.S. Cl. .............. 359/883; 359/359; 359/360; 359/584; 359/585

(58) Field of Search .............. 359/359, 360, 359/584, 585, 589, 883, 884; 428/213

(56) References Cited

U.S. PATENT DOCUMENTS

| | | | | |
|---|---|---|---|---|
| 3,363,998 A | * | 1/1968 | Keister et al. | 359/884 |
| 3,601,471 A | * | 8/1971 | Seddon | |
| 3,978,273 A | * | 8/1976 | Groth | |
| 4,214,818 A | * | 7/1980 | Choyke et al. | |
| 4,537,798 A | * | 8/1985 | Cohen | |
| 4,822,120 A | * | 4/1989 | Fan et al. | |
| 4,955,705 A | * | 9/1990 | Nakajima et al. | 359/884 |
| 5,007,710 A | * | 4/1991 | Nakajima et al. | 359/884 |
| 5,019,458 A | * | 5/1991 | Elgat et al. | 359/883 |
| 5,169,229 A | * | 12/1992 | Hoppert et al. | |
| 5,201,926 A | * | 4/1993 | Szczyrbowski et al. | |
| 5,216,551 A | * | 6/1993 | Fujii | |
| 5,239,566 A | * | 8/1993 | Nakamura et al. | |
| 5,267,081 A | * | 11/1993 | Pein | 359/584 |
| 5,344,718 A | * | 9/1994 | Hartig et al. | |
| 5,377,045 A | * | 12/1994 | Wolfe et al. | |
| 5,563,734 A | * | 10/1996 | Wolfe et al. | 359/360 |
| 5,584,902 A | * | 12/1996 | Hartig et al. | |
| 5,705,278 A | | 1/1998 | Gillery et al. | |
| 5,745,291 A | * | 4/1998 | Jenkinson | 359/884 |
| 5,837,362 A | * | 11/1998 | O'Connell et al. | |
| 6,020,077 A | * | 2/2000 | Schicht et al. | |
| 6,042,934 A | * | 3/2000 | Guiselin et al. | 428/213 |

FOREIGN PATENT DOCUMENTS

| | | | |
|---|---|---|---|
| EP | 0 301 755 | 1/1989 | |
| JP | 61-284703 | * 12/1986 | 359/884 |
| JP | 4-253001 | * 9/1992 | 359/884 |
| JP | 405127003 | * 5/1993 | 359/884 |
| JP | 405127004 | * 5/1993 | 359/884 |

* cited by examiner

*Primary Examiner*—Ricky D. Shafer
(74) *Attorney, Agent, or Firm*—Banner & Witcoff, LTD (57) ABSTRACT

Thermostable mirrors comprise an optically transparent glass substrate and a thermostable mirror coating on a surface of the substrate. The mirror coating has a reflective chromium-based layer (formed of Cr or Ni—Cr) which preferably is used with reflectivity enhancing layer of silver or copper metal. Such reflectivity enhancing layer can be sandwiched between chromium-based layers. Optical color may be provided by a color-forming oxide layer, such as a layer of $CuO_x$ between the glass substrate and the reflective layer(s). The reflective coating is thermostable at the tempering temperature of the glass. The coating provides controllable reflectivity and, optionally, controllable color properties, which are substantially stable through exposure of the substrate to tempering and bending temperatures. In accordance with a method of manufacturing the coated article, the thermostable coating is deposited by D.C. magnetron sputtering in a multi-station sputtering chamber.

2 Claims, 3 Drawing Sheets

THERMOSTABLE BACK-SURFACE MIRRORS

The present invention is directed to thermostable back-surface mirrors with controllable reflectance, comprising a substantially transparent glass substrate which is coated with a thermostable mirror coating. The coated glass mirrors can be tempered and bent to a desired shape while remaining reflective. The present invention also is directed to methods for the production of such thermostable back-surface mirrors.

BACKGROUND

Reflective coatings for transparent glass substrates, such as automotive, architectural or decorative glazing, industrial mirrors, components of scientific or navigational instruments, and optical lenses, are known to those skilled in the art. It would be desirable to have a back-surface mirror which adequately retains its reflective properties under thermal stresses encountered during tempering or bending the glass substrate; however, known mirror coatings are functionally diminished in reflectance or are otherwise degraded to an unacceptable degree when subjected to such high temperatures.

According to prior known methods, the glass substrate is first tempered and shaped prior to coating. Thus, the resulting shaped articles must be coated individually, rather than in bulk as part of a single, large glass sheet. This has the substantial disadvantage of increasing production time, cost and complexity. Also, in order to coat an article which is not flat, e.g, a curvo-planar article, specialized coating apparatus is required, which results in further expense. A reflective glass coating is disclosed by Chesworth et al in European Patent Application 0 301 755. This prior art coating comprises a layer of at least one metal having an atomic number of 22 to 29 and a thin layer of aluminum applied over the metal layer, the latter for thermal protection during tempering or bending. Heat processable, metallic coatings, and vacuum coatings, are disclosed in U.S. Pat. No. 5,705,278 to Gillery et al.

Also known are front-surface mirrors. Front-surface mirrors suffer the disadvantage that it is difficult to achieve adequate long-term adhesion between the substrate and the metal mirror coating. The front-surface mirror coating is applied in a cold coating process as the last step after the glass has been formed and bent to shape. Also known are transparent mirrors, that is, half-mirrors, such as those employing alternating layers of $TiO_2/SiO_2$. The deposition of a large number of alternating layers for this type of mirror structure is costly and complex. Some known mirrors are provided with a condensation or ice control mechanism employing electrical heating. A typical structure would include a silver metal film applied on a surface of the glass by silkscreen or other technique, to act as an electrical resistance heater. A black paint layer is then applied over the silver metal film. Both the black paint layer and the silver metal film then must be dried simultaneously at about 600° C., during which the glass is bent into the desired shape.

It is an object of this invention to provide thermostable, optionally colored, back-surface mirrors comprising a substantially transparent glass substrate, wherein the mirror coating is thermostable at the tempering or bending temperature of the glass substrate.

It is an object of at least certain preferred embodiments of the invention to provide back-surface mirrors with the desired reflectivity values ranging from above 53% to 85%, having color or no color, which are thermostable at the bending temperature of the glass substrate.

It is a further object of the invention to provide methods for the manufacture of the above-described Thermostable, reflectivity-controllable and color-controllable, back-surface mirrors.

Additional objects and advantages of the present invention will be readily understood by those skilled in the art given the benefit of the following disclosure of the invention and detailed description of certain preferred embodiments.

SUMMARY

The present invention provides a highly reflective, thermostable, chromium-based back-surface mirror, optionally being optically colored, comprising a transparent glass substrate and a thermostable mirror coating on a surface of the glass substrate. It should be understood that, as used here, a "back surface" mirror is reflective through the glass substrate, that is, when viewed through the glass substrate from the surface opposite that surface which caries the thermostable mirror coating. In accordance with one aspect, the novel thermostable back-surface mirrors have a reflective chromium-based mono-layer. As used here, "chromium-based" means chromium or any suitable Ni—Cr alloy and "reflective chromium-based mono-layer" means a single layer of Cr or Ni—Cr which is the only reflective material in the mirror coating. In certain preferred embodiments, these mirrors have been thermally processed, i.e., tempered and/or heated for bending. The reflective chromium-based mono-layer in such mirrors has a thickness exceeding that of chromium layers employed in prior known mirrors. More specifically, the reflective chromium-based mono-layer is sufficiently thick to maintain mirror-quality, back-surface reflectivity after such heat treatment, even without an overlying protective layer. Exemplary chromium-based mirrors disclosed here employ a chromium or Ni—Cr layer 140 nm thick. Embodiments of the present invention employing a soda-lime-silica glass substrate with a 140 nm thick chromium-based mono-layer and no protective material overlying the mono-layer, still have coating capacity and mirror-quality back- surface reflectance, e.g., greater than 53% back-surface reflectance, after tempering and bending. The front surface of the chromium-based mono-layer, which is exposed to atmosphere during the heating, oxidizes to form a self-protective CrOx surface imparting a substantially non-reflective, blue-colored appearance. In contrast, mirrors of the above-mentioned EP application 0 301 755 employ a chromium reflective layer only 60 nm thick and require a protective aluminum layer overlying the front surface to maintain back-surface reflectivity after heat treatment.

In accordance with another aspect of the invention, thermostable back-surface mirrors have a reflective chromium-based layer, i.e., Cr or Ni—Cr, together with a reflectivity enhancing metal layer of silver or copper between the glass substrate and the chromium-based layer. In certain preferred embodiments, the reflectivity enhancing metal layer is sandwiched between chromium-based layers. The reflectivity enhancing layer, especially in the case of silver, should be protected against oxidation, both from the glass side and from the outside. The overlying chromium-based layer protects the outside. A buffer layer is used to protect the glass side. The second (i.e., glass side) chromium-based layer serves as such required buffer in the preferred embodiments mentioned above, wherein the reflectivity enhancing silver or copper metal layer is sandwiched between chromium-based layers. Alternative buffer layers between the reflectivity enhancing layer and the glass include a layer of Si. The buffer should be sufficiently thin to be substantially transparent to visible light, so as to maintain back-surface reflectance. It should be sufficiently thick to provide adequate protection against oxidation of the reflectivity enhancing metal layer. A buffer layer also can be used in preferred embodiments of the invention employing a chromium-based mono-layer for reflectivity.

In accordance with another aspect of the invention, the thermostable mirror coating includes an oxide layer between the above-mentioned layers and the glass substrate. In certain preferred embodiments, the oxide layer is a color-forming layer of copper oxide ($CuO_x$) or tin oxide ($SnO_2$). In other preferred embodiments, the oxide layer is a colorless oxide, e.g., $WO_3$. The thermostable mirror coating is reflective through the glass substrate, that is, the mirror is reflective when viewed from the glass substrate surface opposite that which carries the thermostable mirror coating. Preferred embodiments of the back-surface thermostable mirrors disclosed here, having the most superior back-surface reflection, comprise a silver or a copper layer sandwiched between a thin Cr or Ni—Cr layer and a thick protective Cr or Ni—Cr layer. The thin chromium layer (as defined above, meaning a Cr or Ni—Cr alloy) is between the silver or copper metal layer and the glass substrate. The thicker chromium layer overlays the silver or copper layer. The thicker chromium layer preferably is substantially thicker than the thin chromium layer, preferably being at least about 17 times as thick, for example, 35 to 100 times as thick. The oxide color-forming layer or transparent oxide is positioned between the glass substrate and the thin chromium layer. The oxide layer is sufficiently thick to provide any desired degree of color, but is not so thick as to unacceptably diminish the reflectivity of the thermostable mirror coating. In accordance with certain preferred embodiments, coloration can be provided through the use of tinted or so-called body-colored glass substrate.

The invention provides a significant advance over prior known mirrors. It provides thermostable back-surface mirrors which are optionally colored. Moreover, the thermostable back-surface mirrors of this invention can be manufactured with excellent control over the degree of coloration, and also with excellent control over the degree of reflectivity. Mirrors of this invention can be highly reflective, like traditional (non-thermostable) silver mirrors, or less reflective. Reflectance can be controlled by adjusting the thickness of the silver or copper metal reflectivity enhancing layer and by other suitable coating adjustments. The degree of color can be controlled by choice of a colorless oxide layer, as mentioned above, or a copper oxide or other color-imparting oxide layer at a thickness corresponding to the desired degree of color. Color also can be controlled by selection of a colored or uncolored glass substrate. As used here, reference to the substantially transparent glass substrate being colored are calculated using the Commission Internationale de L'Eclairage (CIE) color difference equation:

$$E=[(L^*)2+(a^*)2+(b^*)2]^{1/2}$$

where a*, b* and L* are color coordinates in CIE uniform color space.

It is highly advantageous that the back-surface mirrors disclosed here are thermostable, i.e., able to withstand the thermal stresses of tempering and/or bending the glass substrate. Thus, considerable reduction in cost and complexity can be achieved in the manufacture of, for example, automotive mirrors and industrial mirrors by providing the thermostable mirror coating disclosed here onto a large flat glass substrate using common architectural glass coaters. Subsequently, the glass substrate with the thermostable mirror coating can be cut to size and then bent and/or tempered. The thermostable mirror coating on the individual cut mirrors, after such bending and tempering, retains its reflectivity to a degree acceptable for the above-mentioned uses, including, e.g., industrial security (or "one-way") mirrors for supermarkets and the like, and for motor vehicle mirrors, etc. An automotive application of the thermostable mirror is as a rear-view car mirror eliminating the blind spot. Further, the invention provides reflective-coated substrates having enhanced decorative properties due to coloration, by virtue of which the claimed articles of manufacture are suitable for use in luxury applications, e.g., tinted mirrors, interior or exterior architectural design and fashion eyewear or other accessories.

In accordance with one aspect, a temperable and bendable back-surface mirror comprises an optically transparent glass substrate and a thermostable mirror coating on a surface of the glass substrate. The thermostable mirror coating is formed of a reflective silver or copper film protected by chromium layers formed of chromium or nickel-chromium alloy, optionally along with an oxide layer between the first chromium layer and the surface of the glass substrate.

In accordance with another aspect of the invention, a tempered back-surface mirror is provided, comprising an optically transparent glass substrate carrying a thermostable mirror coating as disclosed and described above. The glass substrate has been subjected to a tempering step in which a temperable and bendable back-surface mirror, as described above, is subjected to temperatures sufficiently high to soften the glass substrate. After heating, the mirror is rapidly cooled so as to temper or toughen the glass. Optionally, the mirror is also bent during such heating step.

In accordance with another aspect of the invention, a process is provided for making tempered back-surface mirrors. Specifically, the inventive process disclosed here comprises a combination of steps, including: providing a substantially transparent glass substrate (clear or colored); forming a thermostable mirror coating on a surface of the glass substrate in accordance with the above disclosure, most preferably by first depositing a substantially transparent oxide layer (e.g., a color-forming oxide layer), followed by a thin chromium layer formed of chromium or nickel-chromium alloy over the oxide layer and then a reflectivity-enhancing metal layer of copper or silver, and then a thick protective chromium or nickel-chromium layer deposited on top of the reflectivity enhancing layer; and then tempering the back-surface mirror by heating it to the tempering temperature of the glass substrate and subsequently cooling. The thermostable mirror coating remains reflective after such tempering step, and in preferred embodiments remains reflective to a degree acceptable for such intended purposes as automotive rear-view mirrors, etc. In fact, it is a significant advantage and a novel feature of certain preferred embodiments, that the reflectivity of the back-surface mirror may actually increase in the tempering or bending step, such that the reflectivity of the resulting, i.e., thermally treated, mirror is higher than that of the mirror before it was thermally treated. Typically, back-surface mirrors formed in accordance with the present invention have post-tempering reflectance (again, measured from the glass side) of from about fifty-four to about eighty-three percent (54%–83%).

The reflectance achieved by heat treated (i.e., tempered or bent) mirrors of this invention is about 54% for certain embodiments in which the reflectivity enhancing silver or copper layer has a thickness approaching zero. A sufficiently thick silver layer results typically in about 83% reflectance (again, meaning back-surface reflectance). Advantageously, any reflectance between these two values can be achieved by selecting a suitable intermediate thickness for the reflectivity enhancing layer of silver or copper. It will be within the ability of those skilled in the art, given the benefit of this disclosure, to select suitable film thicknesses to achieve a desired degree of reflectance.

The above values are for mirrors of this invention having optically opaque chromium reflective layers. Correspondingly lower reflectance values are achievable in accordance with alternative embodiments of this invention intended for use as one-way mirrors. One- way mirrors or half-mirrors of the invention employ reflective chromium layers and a reflectivity enhancing silver or copper layer (along with a buffer and/or oxide layer as needed) which are sufficiently thin as to be partially transparent to visible light. It will be within the ability of those skilled in this area of technology, given the benefit of this disclosure, to select sufficiently thin chromium layers and a sufficiently thin layer of silver or copper to achieve a thermostable, back-surface, one-way mirror. Similarly, back-surface mirrors with a color-forming layer in accordance with the present invention, having a thermostable mirror coating on a surface of a glass substrate, may be filly reflective or partially-reflective. Examples of partially-reflective mirrors in accordance with the present disclosure include "one-way" glass and mirrored optical glass, which must reflect light without preventing viewing through the mirror by an observer positioned behind the reflective coating (relative to the light source). Back-surface mirrors in accordance with the present invention which are intended for use as a half-mirror or partially-reflective mirror, with or without a color-forming layer, typically will have reflectance of visible light of at least fifteen percent (15%), more preferably twenty to forty percent (20–40%). Correspondingly, transmittance of visible light for such half-mirrors in accordance with the present invention, will be at least about five percent (5%), more preferably ten to forty percent (10–40%). Visible light absorption is about 50% for such one-way or half-mirrors having 5% transmittance, and about 40% for such mirrors having 40% transmittance.

The thermostable mirror coatings employed in the back-surface mirrors of the present invention are "thermostable" in the sense that they are stable at the tempering and/or bending temperature of the glass substrate. More specifically, the thermostable, reflective mirror coatings have the reflectance properties described above after being subjected to the high temperature heating cycle necessary for such bending or tempering of the glass substrate. In addition, the term "thermostable" means that the back-surface mirrors disclosed here retain their mechanical properties, such as body integrity, surface continuity, tensile strength and adhesiveness (e.g., at the interface of coating and substrate). In accordance with certain preferred embodiments of the invention, the reflective thermostable mirror coatings are thermostable as here described at temperatures of at least 400° C., more preferably at least between about 550° C. and 650° C.

As used herein, the term "bendable" refers to the back-surface mirror being bendable at elevated temperatures to assume and maintain a non-planar body shape. In accordance with certain preferred embodiments, the back-surface mirror is bendable from a planar, that is, flat form into a curvo-planar body shape having a curve or angle of at least 1 degree without breakage or other physical damage, such as crazing, and without substantial loss or diminution of transparency to visible light, strength, etc., at a temperature of at least 600° C.

Preferably, the reflective thermostable mirror coating lies directly on the surface of the substrate. As used here and in the appended claims, the reflective, thermostable coating is said to be "directly on" or to "directly overlie" the glass substrate if no other material or coating is positioned between them. In this regard,. the coating may be said to lie directly on the substrate notwithstanding that there may be a slight transition zone between them, e.g., involving migration of the material of the coating into the substrate and/or interface reaction products. In certain embodiments, especially where no oxide layer is employed between the glass substrate and the first chromium layer, it is presently understood that an oxide interface, believed to be chromium oxide, forms between the glass and the chromium layer during the heat treatment. Consequently, reflection is enhanced after heat treatment in certain preferred embodiments, particularly at temperatures above about 400° C., because of the anti-reflection ("AR") and transparency enhancing properties of such chromium oxide. Adhesion also is improved. This is presently understood to involve the attraction of oxygen from the glass. In addition, the chromium layer (of Cr or Ni—Cr) will have a protective oxide layer, even at elevated temperatures. The thickness of such a protective oxide layer is believed to be about 40 nm at 650° C. For this reason, the (thicker) chromium layer overlying the reflectivity enhancing layer provides excellent long-term protection, rendering the back-surface mirrors disclosed here advantageously shelf-stable even without an auxiliary protective layer, e.g., without the aluminum protective layer used in the above-mentioned European patent application No. 0 301 755. One-way or half-mirror embodiments of the invention disclosed here, having a top-most (or outermost) chromium layer which is less thick, preferably further comprise a top-most film of oxide, preferably stoichiometric oxide, for enhanced protection at elevated temperatures against volume changes and resultant micro cracks in the mirror coating.

In accordance with certain preferred embodiments of the invention, an oxide layer is employed with the chromium layers and reflectivity enhancing layer. As disclosed above, the oxide layer can be a color-forming $CuO_x$ layer located at the interface of the mirror coating with the glass substrate. In addition, in certain embodiments, an oxide coating of $CuO_x$ or $SnO_2$ or the like can be used at both surfaces of a glass substrate for a double-sided, colored mirror. In addition, in certain half-mirror embodiments employing thinner chromium layers, an oxide layer can be employed as a protective overlayer, i.e., as an outermost layer to protect the other layers of the mirror coating from environmental attack. Such half-mirror embodiments preferably are otherwise as disclosed above.

In accordance with certain preferred embodiments, the back-surface mirrors disclosed here comprise a tinted or body-colored glass substrate. Thus, the glass substrate onto which the reflective thermostable mirror coating is deposited will have color properties additional to any contributed by a copper oxide (slightly absorbing) or any other transparent oxide, e.g., $SnO_2$, layer of the thermostable mirror coating. Numerous different tinted glasses suitable for use in the present invention are commercially available and will be readily apparent to those skilled in the art given the benefit of the present disclosure. In certain preferred embodiments, the substantially transparent glass substrate is formed of soda-lime-silica glass, borosilicate glass, aluminosilicate glass, vycor, fused silica or vitreous glass or highly transparent low-iron glass.

In accordance with certain preferred embodiments, the reflective thermostable mirror coating is deposited by sputtering in one or a series of sputter stations arranged sequentially in a single sputtering chamber through which the transparent glass substrate passes at constant travel speed. Suitable partitions, such as curtains or the like, separate one sputter station from the next within the sputtering chamber, such that different deposition atmospheres can be employed at different stations. A reactive atmosphere comprising oxygen, for example, can be used at a first station to deposit an oxide, e.g., the above described color-forming copper oxide or tin oxide layer of the thermostable mirror coating, followed by a non-reactive atmosphere comprising argon, for example, at a second station to deposit the chromium layer of chromium or nickel-chromium. For a thermostable mirror with a reflectivity enhancing film, a silver or copper target can be used at the subsequent station with non-reactive sputtering conditions. The top chromium layer is then deposited under conditions similar to those used for the first chromium (or Ni—Cr) layer. In a typical embodiment formed in this way, the resulting film thicknesses (listed in the following order: Glass/Cr/Ag/Cr) are: 50/250/1400 angstroms, respectively. Thus, in such typical embodiment, the chromium layer closer to the glass is formed of Cr about 50 Angstroms thick; the reflectivity enhancing layer is formed of Ag about 250 Angstroms thick; and the outermost chromium layer overlying the silver is formed of Cr about 1,400 Angstroms thick.

It will be apparent to those skilled in the art in view of the present disclosure, that the present invention is a significant technological advance. Preferred embodiments of the back-surface mirror disclosed here, comprising a reflective thermostable mirror coating on the surface of an optically transparent glass substrate, have excellent performance characteristics, including advantageously good color control and reflectance control, and advantageously high physical integrity. Also, temperable and bendable back-surface mirrors comprising such thermostable mirror coating on a glass substrate can be stored for months and even years without substantial degradation. Thus, a quantity of such unformed mirror stock can be maintained in storage for extended periods of time, and then cut to desired size and subjected to a tempering and bending operation when needed. Also, a buffer or color-forming oxide layer and/or other oxide layer(s), the chromium layer formed of chromium or nickel-chromium alloy and any reflectivity enhancing layer can be deposited by commercially known and available sputtering techniques at advantageously high deposition rates, even employing advantageously low deposition power densities. Specifically, regarding the oxide layer, the deposition of tin oxide or copper oxide is economical, as both tin and copper can be sputtered from a pure metal target which is inexpensive and is not greatly subject to target poisoning. The resulting fast production speeds, combined with low materials costs, yields corresponding savings in production costs.

A 3 nm to 50 nm thick copper oxide layer or 10 nm to 100 nm tin oxide layer is sufficient to confer perceptible color to a back-surface mirror or half-mirror as disclosed here. In addition, both copper oxide and tin oxide exhibit very good adhesivity to the glass substrate, and the high density of the copper oxide color layer employed in the bendable, coated articles of the invention, which is found to be as high as bulk value or nearly bulk value, results in excellent durability. This results in advantageously good physical stability and long color retention for the coated articles disclosed here. Also, copper oxide has an advantageously low absorption coefficient in the visible and infra-red regions, together with an advantageously high refractive index similar to silicon, e.g., 3.5 for 550 nm. In short, the copper oxide color layer of the back-surface mirrors disclosed here has advantageous thermal and spectral properties, robust deposition properties and excellent mechanical film properties.

Additional features and advantages of the various embodiments of the present invention will be further understood in view of the following detailed description of certain preferred embodiments.

BRIEF DESCRIPTION OF THE DRAWINGS

Various preferred embodiments of the coated article of manufacture and method of manufacture disclosed above are discussed below with reference to the appended drawings in which.

It should be understood that the schematic illustrations in the drawings are not necessarily to scale. In particular, the thickness of the various layers forming the mirror coating system, e.g., the buffer layer, silver or copper reflectivity enhancing layer, and protective reflective chromium or nickel-chromium layer are not to scale and are increased relative the thickness of the substrate for the purpose of clarity and ease of illustration.

DETAILED DESCRIPTION OF CERTAIN PREFERRED EMBODIMENTS

It will be apparent to those skilled in the art, given the above disclosure and the following detailed description, that back-surface mirrors comprising a reflective thermostable mirror coating on a surface of a glass substrate, and the precursors for such back-surface mirrors, that is, temperable and bendable back-surface mirror stock, have numerous commercially-significant applications. Coated articles in accordance with certain preferred embodiments are suitable for use as mirrors for automotive, architectural or decorative use, and as half-mirrors for automotive, architectural, surveillance or optical use. Such materials have use as externally-mounted rear-view mirrors (e.g., door mirrors), one-way windows suitable for aesthetic value, privacy or security or as fashion sunglasses.

For ease of discussion, the following detailed description of certain preferred embodiments will focus primarily on mirrors suitable for automotive or architectural applications, such as a rear-view mirror for a motor vehicle. It will be within the ability of those skilled in the art, given the above disclosure and this detailed description, to employ the invention in alternative applications.

Figure 1:
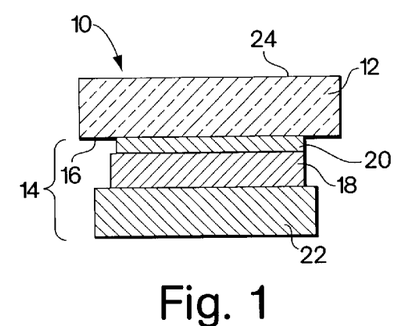
FIG. 1 is a schematic cross-sectional view of a thermostable, back-surface mirror in accordance with one embodiment of the present invention, comprising a thermostable mirror coating system.

Referring now to the drawings, FIG. 1 is seen to schematically illustrate a back-surface mirror 10 in accordance with the present invention, comprising a glass substrate 12. A thermostable mirror coating 14 is carried on surface 16 of glass substrate 12. Mirror coating 14 comprises a reflectivity enhancing layer 18 formed of silver, but alternatively formed of copper. A first chromium layer 20 lies directly on glass surface 16 and is formed of Cr, although alternatively it may be formed of Ni—Cr. Advantageously, chromium layer 20 serves as a buffer layer for silver layer 18. It also serves as an anti-reflection layer for the mirror coating. In addition, it serves as an adhesion layer between the mirror coating 14 and the glass substrate 12. Overlying silver layer 18 is a thicker chromium layer. Specifically, reflective chromium layer 22 formed of Cr, but alternatively formed of Ni—Cr, acts as a protective layer for the reflectivity enhancing layer 18 and for the rest of mirror coating 14, generally. Surface 16 may be referred to as the back surface of substrate 12, such that back-surface reflectance is measured as the percentage of light passing through glass substrate 12 from front surface 24, which is reflected back through surface 24 from mirror coating 14.

Figure 2:
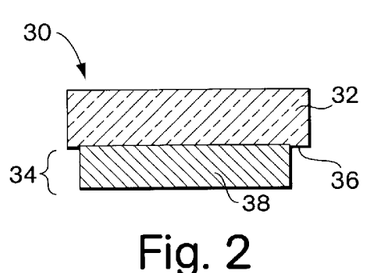
FIG. 2 is a schematic cross-sectional view of a back-surface mirror.

FIG. 2 shows a simple back-surface mirror according to an alternative preferred embodiment of the invention. Specifically, back-surface mirror 30 is seen to comprise a glass substrate 32 carrying mirror coating 34 on its back surface 36. Mirror coating 34 is seen to comprise a chromium-based reflective mono-layer 38, specifically, a single layer of Cr or Ni—Cr having a thickness preferably greater than about 100 nm, more preferably about 120 to 160 nm, e.g., approximately 140 rim thick. Optionally, the embodiment illustrated in FIG. 2 could further comprise a color-imparting oxide layer between plan surface 36 and chromium-based mono-layer 38.

Figure 3:
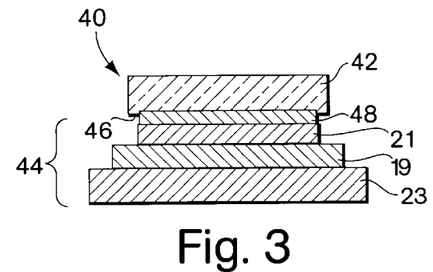
FIG. 3 is a schematic cross-sectional view of a back-surface mirror in accordance with an alternative embodiment of the present invention, comprising a thermostable mirror coating with a color-forming oxide layer.

FIG. 3 illustrates an alternative preferred embodiment of the present invention. Specifically, back-surface mirror 40 is seen to comprise a glass substrate 42 carrying thermostable mirror coating 44 on its back surface 46. Mirror coating 44 is the same as mirror coating 14 of FIG. 1, except that it further comprises a color-forming oxide layer 48. Thus, oxide layer 48 is seen to be positioned directly on glass surface 46, between surface 46 and chromium buffer layer 21. Reflectivity enhancing layer 19 overlies chromium buffer layer 21. Protective chromium layer 23, which is substantially thicker than chromium buffer layer 21, overlies reflectivity enhancing layer 19.

Figure 4:
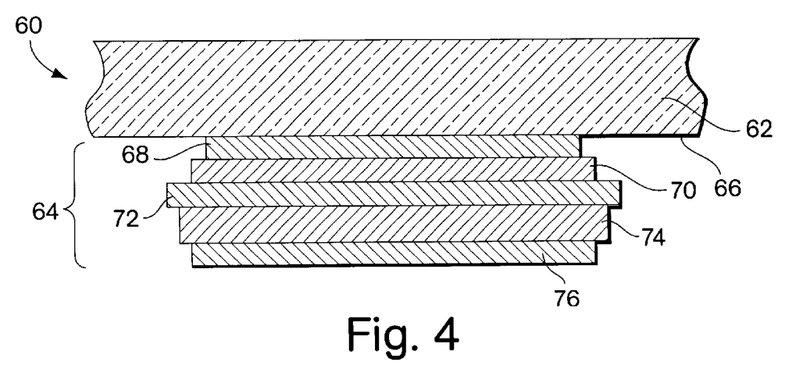
FIG. 4 is an alternative embodiment to the present invention, comprising a half-mirror (or one-way mirror) with color-forming layers.

FIG. 4 illustrates another alternative preferred embodiment of the present invention.

Specifically, FIG. 4 schematically illustrates thermostable back-surface mirror 60 comprising glass substrate 62 carrying thermostable mirror coating 64 on its surface 66. Mirror coating 64 is seen to have color-forming oxide layer 68 directly on surface 66. Chromium buffer layer 70 overlies color-forming oxide layer 68. Reflectivity enhancing layer 72 overlies buffer layer 70. Protective chromium layer 74 overlies reflectivity enhancing layer 72 and is substantially thicker than chromium buffer layer 70. Mirror coating 64 further comprises a second color-forming oxide layer. Specifically, color-forming oxide layer 76 overlies protective layer 74. The two color-forming oxide layers may be formed of the same or different materials. Preferably, they are formed of copper oxide or tin oxide. It will be within the ability of those skilled in the art to select a suitable thickness of chromium or nickel chromium alloy for the chromium layer, given the benefit of this disclosure. In certain preferred embodiments, employing a glass substrate 2.2 mm thick, the chromium layer will have a thickness of at least 150 nm. Such preferred embodiments are found to be well adapted to tempering and bending at temperatures of about 575° C. The thickness of the chromium layer should increase as the thickness of the glass substrate increases. Further, for preferred embodiments employing a chromium layer of at least 150 nm thick on a 2.2 mm thick glass substrate, an oxide layer, e.g., a copper oxide layer, preferably is between 5 nm and 30 nm. It will also be within the ability of those skilled in the art to select suitable thicknesses for the reflectivity enhancing layer to achieve a desired degree of reflectivity for the thermostable mirror. In this way, the degree of reflectivity can be readily controlled.

EXAMPLE 1

This example illustrates the manufacture of simple back-surface mirrors in accordance with preferred embodiments of the invention. A reflectivity enhancing layer, if formed of silver metal, preferably is about 5 nm to 50 nm thick. The reflectivity enhancing layer, if formed of copper metal, preferably is about 3 nm to 50 nm thick. More preferably, the reflectivity enhancing layer is about 10 nm to 40 nm thick. The first chromium layer, that is, the one closer to the glass substrate, formed of chromium or Ni—Cr, preferably is about 2 nm to 10 nm thick, more preferably about 4 nm to 7 nm thick. The second or outer chromium layer, formed of chromium or Ni—Cr, preferably is about 80 nm to 250 nm thick, more preferably about 120 nm to 200 nm thick. The oxide layer underlying the first chromium layer, formed of copper oxide, preferably is 10 nm to 50 nm thick, more preferably 15 nm to 40 nm thick. If formed of tin oxide or $WO_x$, the thickness is preferably 10 nm to 60 nm, more preferably 15 nm to 50 nm. In both runs shown in Table 1 below, a 12 inch by 12 inch flat glass substrate 0.1 inch thick was passed through a multi-station D.C. magnetron sputtering pilot line at a substantially constant travel speed 0.12 m/min. The D.C. magnetron sputtering pilot line was model Z600 available from Balzers. In each case, deposition occurred in an argon atmosphere. Deposition parameters are listed in Table 1 below.

Certain preferred embodiments of the present invention are suitable for use as electrically heatable mirrors, for example, heatable rear view mirrors for motor vehicles. In accordance with such embodiments, mirrors as described above, such as the mirrors of Example 1, above, can be provided with an electrically conductive layer and suitable electrical connections to a power source, such as the motor vehicle battery or the like. In accordance with certain especially preferred embodiments, a heatable mirror comprises a glass substrate on one surface of which the thermostable mirror is deposited. A layer of paint is deposited over the mirror, preferably black paint, preferably by silk-screen printing. A conductive paint layer is then applied, preferably again by silk-screen printing. The heating and bending of such bendable mirrors follows the procedures disclosed above. Optical properties for such mirrors are substantially the same as those for mirrors without the paint layers. It will be within the ability of those skilled in the art, given the benefit of this disclosure, to select suitable paints and painting methods for producing heatable mirrors in accordance with the present invention.

TABLE 1

| Run No. | Target | Power (KW) | Number of Passes | Speed (m/min.) | Ar (Sccm) | Pressure (mbar) |
|---|---|---|---|---|---|---|
| 1042 | Cr | 2.0 | 1 | 0.12 | 80 | $3.6 \times 10^{-3}$ |
| 1067 | Ni—Cr | 2.0 | 1 | 0.12 | 80 | $3.7 \times 10^{-3}$ |

For run number 1042 shown in Table 1 above, the resulting layer of chromium on the glass substrate surface was approximately 145 nm thick. In run number 1067, the Ni—Cr layer was approximately 140 nm thick. The back-surface mirrors of this Example 1 have the basic construction illustrated in FIG. 2 of the drawings.

The two back-surface mirror samples were subjected to heat treatment. Specifically, heat treatment was applied to the samples in an automotive glass bending furnace in accordance with a standard windshield bending process using a small mold. This example also shows a suitable thickness for a thermostable mirror which is opaque before and after heat treatment. The furnace has the same loading and unloading port. In the forward direction of glass movement in the furnace, the glass is heated and bent. This takes about 15 minutes for heating up to 550° C.; bending then takes place between 550° C. and 680° C. These are furnace temperatures; the glass temperature is within about 15 ° C. of the furnace temperature. Then the glass moves backward for cooling down within another 15 minutes. Both the chromium mirror coating of run number 1042 and the Ni—Cr mirror coating of run number 1067 are approximately the minimum coating thickness required for a thermostable mirror which is opaque both before and after heat treatment. The optical properties of the two mirror samples are given below in Table 2.

TABLE 2

| Run No. | Target | Reflectance | Dominant Wave Length | Purity | L | a | b |
|---|---|---|---|---|---|---|---|
| 1042 | Cr | 48%–55% | 488 nm | 1.5 | 75 | −2.2 | −0.3 |
| 1067 | Ni—Cr | 54%–59% | 569 nm | 5.9 | 77 | −0.6 | 4.95 |

The optical performance characteristics recited in Table 2, above, should be understood to be back-surface reflection, that is, reflection measured from the front (i.e., uncoated) surface of the glass for light passing through the glass to the mirror coating and back through the uncoated front surface. The data in Table 2 were measured for the two mirror samples after heat treatment, except that reflectance values are given for both pre-heat treatment and post-heat treatment measurement. Thus, for run No. 1042, reflectance is seen to be 48% prior to heat treatment and 55% after heat treatment. It can be seen that heat treatment did not affect back-surface reflection properties, except that reflectance increased approximately 10% or more.

EXAMPLE 2

This example presents a highly reflective, thermostable back-surface mirror in accordance with the present invention. More specifically, the thermostable back-surface mirror of this example has the structure shown in FIG. 1 of the drawings. Performance characteristics before and after heat treatment are provided in Table 3 below. Table 3 also presents the corresponding performance characteristics for three different control samples. The performance properties for a silver mirror (not subject to heat treatment) are shown. Run number 1042 shows the performance properties, both before and after heat treatment, for a back-surface mirror sample wherein the mirror coating comprises a single layer of chromium 1450 Angstroms thick. Run number 1067 shows the optical performance characteristics, both before and after heat treatment, wherein the back-surface mirror coating was formed as a single layer of Ni—Cr 1400 nm thick. The three additional samples in accordance with the present invention, specifically, run number 1101, run number 1107, and run number 1115, all were thermostable back-surface mirrors wherein the mirror coating comprised a reflectivity enhancing layer of silver sandwiched between a chromium buffer layer directly on the glass substrate, and a thicker chromium protective layer overlying the silver layer. In all cases, that is, in all six runs, a clean flat plane of soda-lime-silica glass, 12 inch by 12 inch, and 0.1 inch thick, was coated substantially in accordance with the equipment and procedure outlined in Example 1, above. For example, 1101, 1107, and 1115, the glass was first coated with a thin chromium buffer layer, using a chromium target powered at 0.3 KW to 0.25 KW using only Argon (80 Sccm) as the sputtering gas ($3.5 \times 10^{-3}$ mbar). Subsequently, a silver (or copper) layer was deposited directly onto the first chromium layer, using again the same Argon atmosphere and a pure silver metal (or copper metal) target. For the silver layer, target power of 1 KW to 1.5 KW was used. Finally, a protective layer was deposited directly over the silver layer. Specifically, a thicker chromium layer was deposited, again with the same parameters given in Table 1. Table 3, below, shows the results for each of the runs, including layer thicknesses and optical performance characteristics.

TABLE 3

| Run No. | Layers/Thickness Å | | | Back Reflectance | Dominant Wavelength (μm) | Purity | L* | a* | b* |
|---|---|---|---|---|---|---|---|---|---|
| Ag mirror | Ag/ 1400 | — | — | 0.923 | 0.557 | 1.7 | 96.9 | −1.6 | 1.99 |
| 1101 | Cr/ 50 | Ag/2 10 | Cr/ 1400 | 0.587 | 0.574 | 3.5 | 81 | .44 | 2.976 |
| t1101 | Cr/ 50 | Ag/ 210 | Cr/ 1400 | 0.672 | 0.569 | 5.6 | 85.4 | −0.7 | 5.2 |
| 1107 | Cr/ 50 | Ag/ 320 | Cr/ 1400 | 0.71 | 0.570 | 5.6 | 87.3 | −0.3 | 5.25 |
| t1107 | Cr/ 50 | Ag/ 320 | Cr/ 1400 | 0.802 | 0.563 | 2.3 | 91.7 | −1.2 | 2.42 |
| 1115 | Cr/ 40 | Cu/ 175 | Cr/ 1400 | 0.539 | 0.580 | 6.5 | 78.1 | 2.76 | 4.94 |

TABLE 3-continued

| Run No. | Layers/Thickness Å | | | Back Reflectance | Dominant Wavelength (μm) | Purity | L* | a* | b* |
|---|---|---|---|---|---|---|---|---|---|
| t1115 | Cr/ 40 | Cu/ 175 | Cr/ 1400 | 0.563 | 0.580 | 8.3 | 79.5 | 3.31 | 6.41 |
| 1042 | Cr/ 1450 | — | — | 0.479 | 0.488 | 1.5 | 74.9 | −2.2 | −0.3 |
| t1042 | Cr/ 1450 | — | — | 0.55 | 0.43 | 2 | 80.0 | −2.0 | 0.0 |
| 1067 | Ni— Cr/ 1400 | — | — | 0.54 | 0.569 | 5.9 | 76.6 | −0.6 | 4.95 |
| t1067 | Ni— Cr/ 1400 | — | — | 0.59 | 0.55?? | 5.9 | 76.6 | −0.6 | 4.95 |

In the table above, run numbers preceded by the letter "t" indicate the sample following heat treatment. In all cases, the heat treatment involved heating the glass in accordance with the same procedure outlined in Example 1, above. It can be seen from Table 3, above, that in the embodiments of the present invention, a thicker silver layer together with a thinner chromium buffer layer provided higher back reflectance following heat treatment. Specifically, for run number 1107, back reflectance of 71.0% was achieved before heat treatment, and this value increased to 80.2% after heat treatment. As noted above, 84% back reflectance is the approximate maximum possible back reflectance for the thermostable mirrors having a silver reflectivity enhancement layer sandwiched between chromium layers on a glass substrate. A back-surface mirror in accordance with the present invention, having a silver reflectivity enhancement layer 35 nm thick sandwiched between a chromium buffer layer 4 nm thick directly on a glass substrate surface and a chromium protective layer 140 nm thick overlying the silver layer, provides 78% to 84% back reflectance before and after heat treatment, respectively.

In accordance with certain alternative preferred embodiments, the silver metal of the reflectivity enhancement layer is replaced by copper metal. Similar advantageous performance characteristics are achieved. The back-surface mirrors of such copper-based embodiments have a reddish color.

EXAMPLE 3

Figure 5:
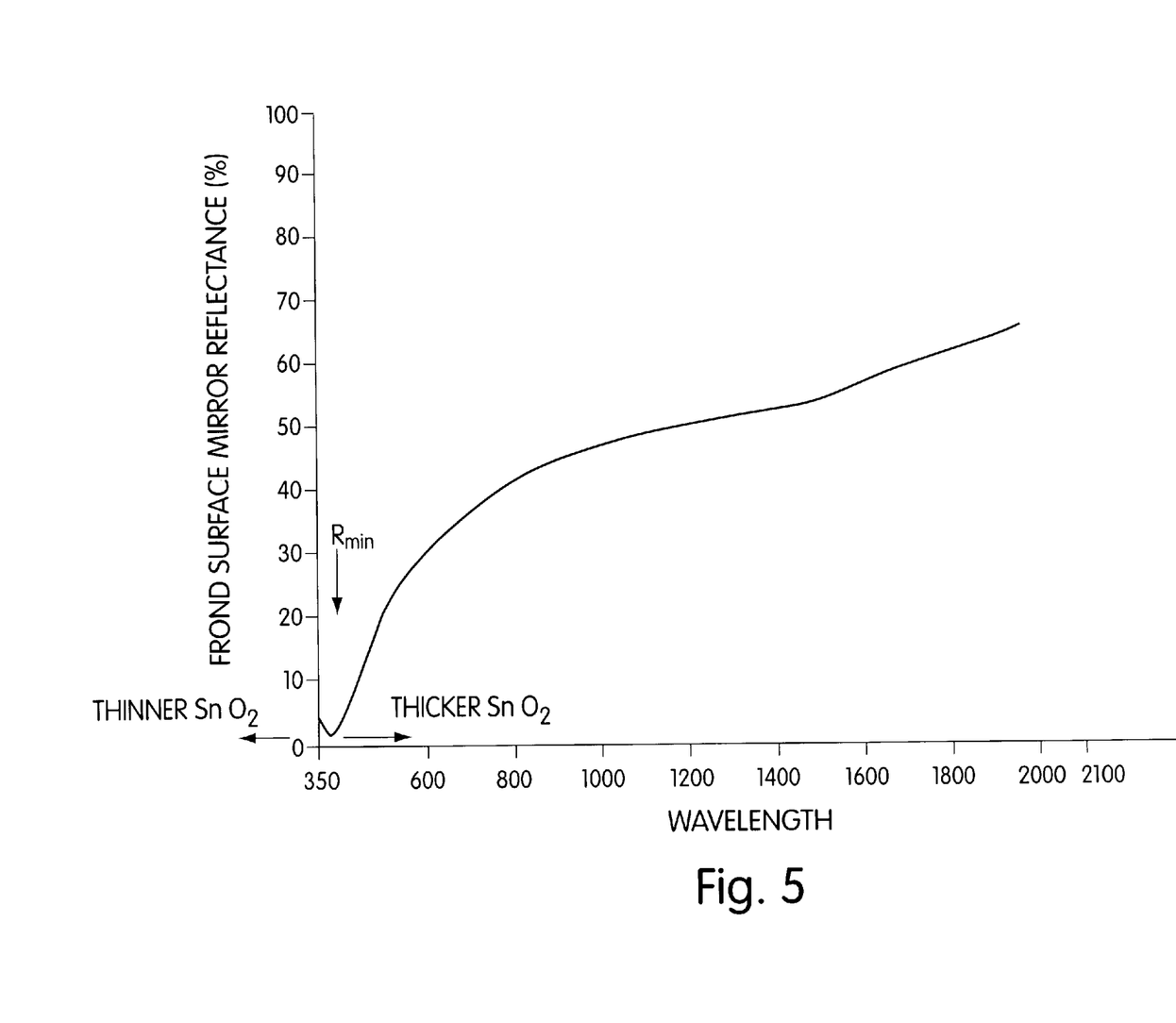
FIGS. 5 and 6 are graphical representations of reflectance data for mirror samples discussed in connection with Example 3, below.
Figure 6:
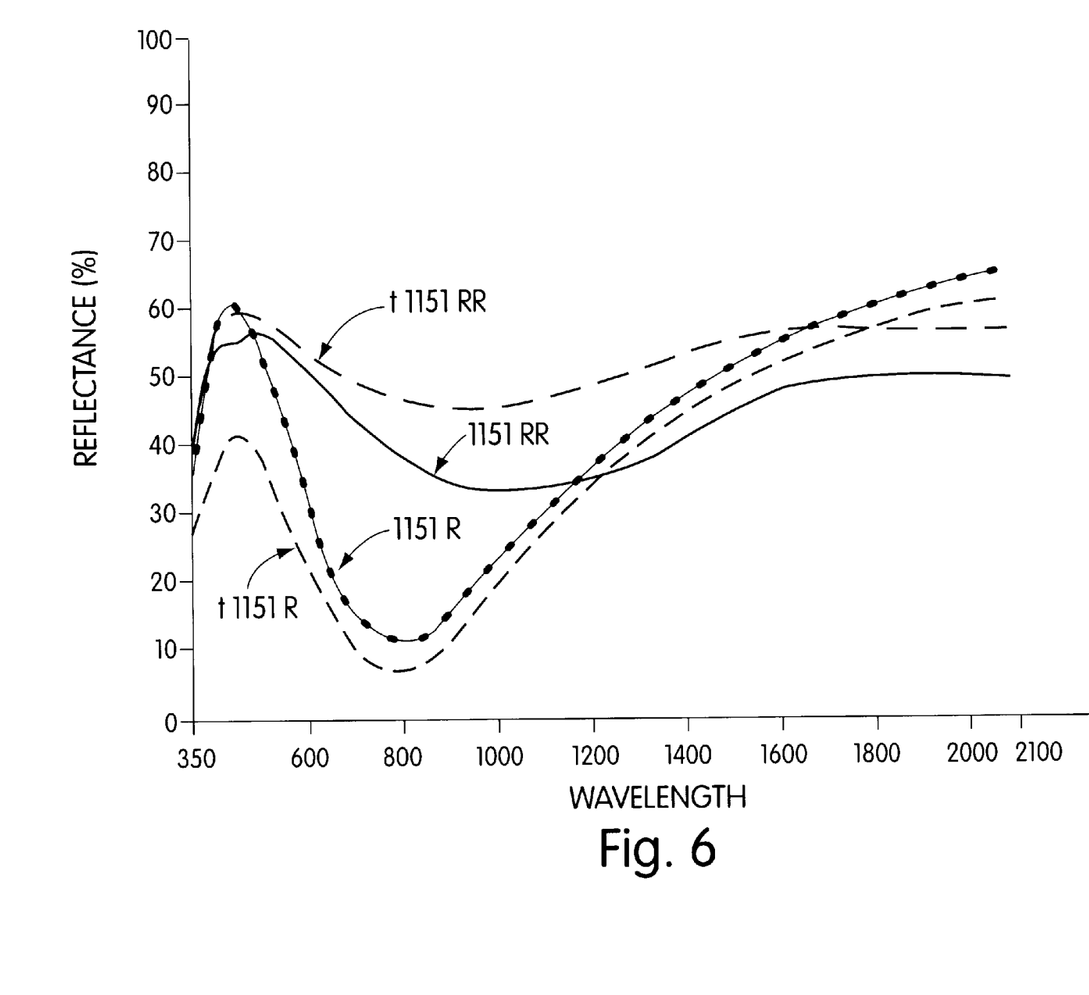

In this example, thermostable, colored, back-surface mirrors in accordance with the invention are provided. Specifically, a thermostable mirror coating was deposited on a glass substrate substantially in accordance with the procedures of the foregoing examples. More specifically, a layer of chromium 140 nm thick was deposited onto the surface of the glass substrate. Over the chromium layer, a color-forming layer of tin oxide was deposited by reactive sputtering from a tin target at a power level ranging from 1.5 KW to 2.0 KW using 45 Sccm of Argon and 65–85 Sccm Oxygen. The higher oxygen flow rates were used with the higher power settings. After subjecting the resulting back-surface mirror to heat treatment in accordance with the procedures of the foregoing examples, it was found that the mirror color was substantially stable. That is, the mirror color after heat treatment was substantially the same as the mirror color before heat treatment. Increasing the tin oxide layer thickness on the chromium layer is found to change the color of the mirror. Specifically, a 20 nm thick tin oxide film is found to have a yellow color. As the thickness of the tin oxide film increases, for example to a film thickness of 45 nm, the yellow color shifts to blue. FIGS. 5 and 6 illustrate the reflectance spectra for thermostable back-surface mirrors in accordance with this example. Specifically, FIG. 5 illustrates the reflectance spectra for the yellow or golden thermostable back-surface mirror of this example wherein the tin oxide layer is 20 nm thick. FIG. 6 illustrates the reflectance spectra for a blue-colored, thermostable, back-surface mirror of this example, wherein the tin oxide layer is 45 nm thick.

In FIG. 5 reflectance is measured as front surface reflectance, that is, reflectance is measured from the "filmed" side, rather than being measured through the glass substrate. Minimum reflection is seen at wavelength 350 nm. The graph in FIG. 6 shows both front-surface and back-surface reflectance. Maximum reflection is seen to be at wavelength 450 nm. More specifically, graph line 1151R shows reflectance from the filmed side. Graph line t1151R shows the same reflectance following heat treatment. Graph line 1151RR shows back reflectance, that is, reflectance through the glass substrate. Graph line t1151RR shows back reflectives following heat treatment mirror sample.

Example 3 was repeated using $CuO_x$ in place of $SnO_2$. Similar results were obtained, demonstrating again the ability of controlling the color of the back surface mirrors of the present invention. That is, good color control was demonstrated by varying the thickness of the oxide layer.

EXAMPLE 4

The blue colored mirror sample of Example 3 (having a tin oxide layer of about 45 nm thick) was produced again, except that the thickness of the chromium layer was reduced to 40 nm. The resulting mirror sample was a half-mirror having 8% light transmittance prior to heat treatment and 17% light transmittance after heat treatment. The reflection color of the half mirror was blue, and remained so after heat treatment.

As noted above, certain embodiments of the present invention employ a body-colored glass substrate. Numerous body-colored glasses suitable for the present invention are commercially available and will be apparent to those skilled in the art given the benefit of the present disclosure. Typically, body-colored glass incorporates one or more coloration ingredients in amounts sufficient to impart color which is optically perceptible to the human eye. Exemplary coloration ingredients for soda-lime-silica glass (which is to be taken as clear in the absence of such coloration ingredients) include cobalt oxide which imparts a blue color, and the like. Certain embodiments substitute such colored glass substrate for the oxide color-forming layer, while other preferred embodiments employ such colored glass substrate in addition to an oxide color-forming layer. Also, some color will be provided by the reflective chromium layer. Chromium layers formed of chromium metal are found to provide a blue tinted luster to the thermostable mirrors of the invention, while chromium layers formed of nickel-chromium alloy are found to provide a slightly yellowish tint. Those skilled in the art will understand that such color contribution from the reflective chromium layer will combine with any color provided by use of tinted or colored glass and color provided a chromium oxide color-forming layer.

It will be within the ability of those skilled in the art to select suitable nickel-chromium alloys for the reflective chromium layer of the thermostable mirror coating. Preferably the nickel-chromium layer has from about five to fifty percent (5 to 50%) nickel, most preferably about twenty percent (20%) nickel, with the balance being chromium. Optionally, small amounts of other metals may be included to the extent they do not unacceptably diminish the reflectivity and thermostability of the thermostable mirror coating.

It should be understood that references here and in the appended claims to the copper oxide layer, unless otherwise clear from the context of any particular instance of its use, is intended to mean $CuO_x$ where x, preferably, is from about 0.5 to 1.0. $CuO_x$ generally imparts a brown color. The thermostable mirrors of the present invention which employ such copper oxide in sufficient film thickness will have a bluish tint or coloration in reflection. In general, thicker $CuO_x$ films will result in more coloration of the mirror. It will be within the ability of those skilled in the art, given the benefit of this disclosure, to determine suitable film thicknesses for each of the layers, including the reflectivity enhancing layers, the oxide layers and the chromium or nickel-chromium alloy layers, adapted to the intended application of the coated article. Typically, as the thickness of the substantially transparent glass substrate increases, the thicknesses of the reflective and color layers must correspondingly increase.

As disclosed above, certain embodiments of the thermostable back-surface mirror have been tempered, while others are temperable but have not as yet undergone a tempering process. Similarly, in accordance with certain preferred embodiments, the thermostable back-surface mirror has undergone bending, preferably during a tempering process, while in other embodiments they have not yet undergone bending. It will be understood from this disclosure that reference to embodiments of the invention being "bendable" means that they are thermostable as the glass substrate is being heated to a sufficiently high bending temperature and then cooled.

Preferred embodiments of the coated articles disclosed here can be prepared in accordance with various known techniques employing commercially available equipment and materials. Preferably, the thermostable mirror coating, including the copper oxide color layer and reflective chromium layer, are formed on the surface of the substantially transparent substrate by D.C. planar magnetron sputtering. In accordance with certain preferred embodiments, a coated article is manufactured by depositing multiple chromium or nickel-chromium alloy sub-layers of the coating in sequence. Preferably, each of the sub-layers is deposited in turn as the substrate travels continuously through a multi-station sputtering chamber. Thus, in manufacturing the embodiment of FIG. 3, for example, as the substrate passes through a first sputtering station within such a multi-station chamber, a copper oxide color-forming layer is deposited. Then, as the substrate passes through multiple subsequent sputtering stations within the multi-station chamber, the layers of chromium or nickel-chromium alloy and the reflectivity enhancing layer are deposited. Depending on the substrate travel speed, deposition parameters, and the desired thickness of the reflective layer and color-forming layer, one, two or more sputtering stations can be used to deposit these layers. Through such use of a multi-station sputtering chamber, one can achieve shorter deposition cycle time. Preferably, the substrate moves continuously through the chamber, such that the individual layers are deposited onto the substrate as it is traveling. The individual stations are typically isolated by curtains or other suitable partition means, such that the reactive atmosphere employed at a first sputtering station. Suitable multi-station sputter deposition chambers are commercially available, including pilot plant size coaters, for example, Model Z600 from Balzers Process System GmbH, D-63755, Alzenau, Germany, and full commercial scale coaters, for example, Interpane 1993 model Coater available from Interpane Glass Industrie AG, Sohnr Eystasse 2137697 Lauenförde, Germany. Advantageously, such preferred multi-station sputtering chambers employ sputter targets which are wider than the transparent glass substrates being coated and are mounted in a direction extending perpendicular to the travel direction of the substrate. It will be within the ability of those skilled in the art, given the benefit of this disclosure, to select suitable deposition conditions and parameters for depositing the substantially transparent color-forming copper oxide layer and the reflective chromium layer thermostable mirrors of the present invention.

It will be apparent from the foregoing disclosure that alternative embodiments are possible within the scope of the invention, including, for example, modifications to the preferred embodiments described above. All such alternative embodiments and modifications which embody the spirit of the present invention are intended to be covered by the appended claims.

I claim:

1. A thermostable back-surface mirror comprising, in combination:

an optically transparent glass substrate; and
   a mirror coating thermostable at temperatures greater than 400° C. on a surface of the glass substrate, said mirror coating having a reflective surface visible through the glass substrate and comprising:
   a reflectivity enhancing layer formed of silver or copper;
   an outer, reflective chromium-based layer overlying the reflectivity enhancing layer; and
   a second chromium-based layer formed of Cr or Ni—Cr alloy between the reflectivity enhancing layer and the glass substrate, wherein the outer chromium-based layer is substantially thicker than the second chromium-based layer.

2. The thermostable back-surface mirror of claim 1, wherein the outer chromium-based layer is at least 3000% thicker than the second chromium-based layer.

* * * * *